US011130329B2

(12) United States Patent
McIver et al.

(10) Patent No.: US 11,130,329 B2
(45) Date of Patent: Sep. 28, 2021

(54) APPARATUS AND METHOD FOR PEELING A LINER AWAY FROM A SUBSTRATE

(71) Applicant: The Boeing Company, Chicago, IL (US)

(72) Inventors: Carl R. McIver, Everett, WA (US); Brice A. Johnson, Federal Way, WA (US); Michael R. Anderson, Renton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/784,732

(22) Filed: Feb. 7, 2020

(65) Prior Publication Data

US 2021/0245491 A1   Aug. 12, 2021

(51) Int. Cl.
  *B32B 43/00*  (2006.01)
  *B32B 38/10*  (2006.01)

(52) U.S. Cl.
  CPC ............ *B32B 43/006* (2013.01); *B32B 38/10* (2013.01); *Y10T 156/1132* (2015.01); *Y10T 156/1174* (2015.01); *Y10T 156/1195* (2015.01); *Y10T 156/1944* (2015.01); *Y10T 156/1978* (2015.01); *Y10T 156/1994* (2015.01)

(58) Field of Classification Search
  CPC . B32B 43/006; B32B 38/10; Y10T 156/1132; Y10T 156/1174; Y10T 156/1195; Y10T 156/1944; Y10T 156/1978; Y10T 156/1994
  See application file for complete search history.

(56) References Cited

U.S. PATENT DOCUMENTS

| 4,732,642 | A |   | 3/1988 | Ametani |  |
|---|---|---|---|---|---|
| 4,775,438 | A |   | 10/1988 | Funakoshi et al. |  |
| 5,108,534 | A | * | 4/1992 | Tveit | B29C 63/0013 156/764 |
| 5,358,591 | A | * | 10/1994 | Candore | B29C 63/0013 156/707 |
| 5,879,505 | A | * | 3/1999 | Fujisawa | B41M 5/38207 156/715 |
| 8,925,613 | B2 | * | 1/2015 | Sato | B65C 9/0006 156/759 |

(Continued)

OTHER PUBLICATIONS

Björnsson et al.: "Automated Removal of Prepreg Backing Paper—A Sticky Problem," SAE International (Sep. 17, 2013).

*Primary Examiner* — Mark A Osele
*Assistant Examiner* — Nickolas R Harm
(74) *Attorney, Agent, or Firm* — Walters & Wasylyna LLC

(57) ABSTRACT

An apparatus is provided for peeling a liner away from a substrate. The apparatus comprises a first member rotatable about an axis. The apparatus also comprises a second member disposed on the first member and for generating a suction force to be applied to the liner to peel a portion of the liner away from the substrate when the suction force of the second member is applied to the liner and the first member is rotating about its axis. The apparatus further comprises a third member synchronized to rotation of the first member about its axis such that the third member clamps the peeled portion of the liner against the first member while the second member is applying suction force to the liner and the first member is rotating about its axis.

20 Claims, 17 Drawing Sheets

(56) References Cited

U.S. PATENT DOCUMENTS

| | | | |
|---|---|---|---|
| 2009/0025875 A1* | 1/2009 | Hagman | B32B 43/006 156/711 |
| 2009/0205781 A1* | 8/2009 | Merrill | B65C 9/42 156/715 |
| 2009/0288760 A1* | 11/2009 | Garben | B41J 29/38 156/230 |
| 2010/0011566 A1 | 1/2010 | Kim et al. | |
| 2010/0108265 A1* | 5/2010 | Tillement | B65H 23/26 156/389 |
| 2010/0167437 A1 | 7/2010 | Yamazaki et al. | |
| 2012/0227909 A1* | 9/2012 | Schindler | H01L 21/67132 156/707 |
| 2013/0133839 A1* | 5/2013 | Seo | B32B 43/006 156/715 |
| 2015/0059987 A1* | 3/2015 | Kumakura | H01L 51/56 156/714 |
| 2019/0184693 A1 | 6/2019 | Johnson et al. | |

\* cited by examiner

APPARATUS AND METHOD FOR PEELING A LINER AWAY FROM A SUBSTRATE

GOVERNMENT RIGHTS

This invention was made with government support under contract number FA8650-17-C-5700 awarded by the Department of Defense. The government has certain rights in this invention.

FIELD

The present application relates to apparatuses and methods for removing liners (e.g., protective liners) from substrates.

BACKGROUND

A liner on a substrate is usually manually peeled away from the substrate to remove the liner by first lifting a corner of the liner, and then pulling the rest of the liner away from the substrate. The manual process of peeling the liner away from the substrate is both laborious and time-consuming and, therefore, costly. In addition, there may be applications or controlled manufacturing environments where manually peeling operations are not suitable. For example, there may be some applications or environments in which it would be desirable to limit exposure to certain materials or chemicals. Attempts have been made to automate the peeling process by using a suction force to initially lift the corner of the liner away from the substrate. However, the suction force is insufficient and unable to withstand the various forces needed to peel the rest of the liner away from the substrate to remove the liner. Therefore, those skilled in the art continue with research and development efforts in the field of peeling liners away from substrates to remove the liners.

SUMMARY

Disclosed are various apparatuses for peeling a liner away from a substrate.

In one example, the disclosed apparatus for peeling a liner away from a substrate includes a first member rotatable about an axis. The apparatus also includes a second member disposed on the first member and for generating a suction force to be applied to the liner to peel a portion of the liner away from the substrate when the suction force of the second member is applied to the liner and the first member is rotating about its axis. The apparatus further includes a third member synchronized to rotation of the first member about its axis such that the third member clamps the peeled portion of the liner against the first member while the second member is applying suction force to the liner and the first member is rotating about its axis.

Also disclosed are various methods for peeling a liner away from a substrate.

In one example, the disclosed method for automatically peeling a liner away from a substrate includes applying a suction force to the liner to secure the liner against an arcuate surface. The method also includes moving the liner and the arcuate surface relative to each other such that a rolled-up portion of the liner rolls up on the arcuate surface during relative motion between the liner and the arcuate surface. The method further includes clamping the rolled-up portion of the liner against the arcuate surface. The method also includes peeling the rolled-up portion of the liner away from the substrate to remove the liner while the rolled-up portion of the liner is clamped against the arcuate surface and the liner and the arcuate surface continue their motion relative to each other.

Other examples will become apparent from the following detailed description, the accompanying drawings, and the appended claims.

DETAILED DESCRIPTION

The present application is directed to apparatuses and methods for peeling a liner away from a substrate. The specific construction of the apparatus and the industry in which the apparatus and method are implemented may vary. It is to be understood that the disclosure below provides a number of embodiments or examples for implementing different features. Specific examples of components and arrangements are described to simplify the present disclosure. These are merely examples and are not intended to be limiting.

By way of example, the disclosure below describes an apparatuses and methods for peeling a protective film away from a pre-impregnated composite for manufacturing an airplane part. The apparatuses and methods may be implemented by an original equipment manufacturer (OEM) or an airplane manufacturing facility in compliance with civil aircraft regulations or military and space regulations, for example.

Figure 1:
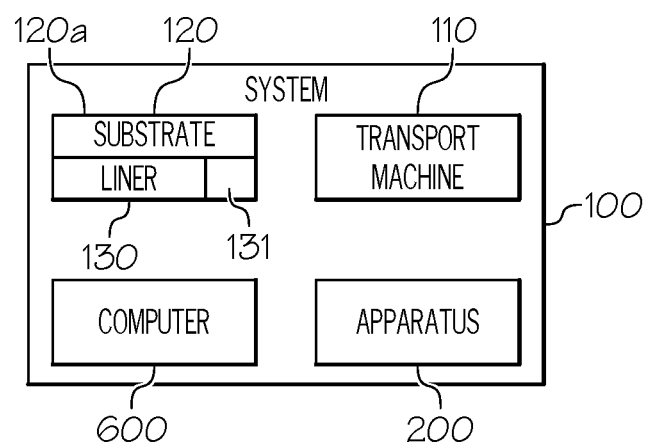
FIG. 1 is a block diagram of an example system that includes an apparatus in accordance with the present disclosure.

Referring to FIG. 1, illustrated is a block diagram of a system 100 that includes an apparatus 200 in accordance with an example of the present disclosure. The system 100 also includes a transport machine 110 for transporting a substrate 120 having a liner 130 to the apparatus 200 to allow the apparatus 200 to peel the liner 130 away from the substrate 120. The liner 130 has a portion 131. The substrate 120 may include a fiber-reinforced composite 120a (e.g., a reinforcing fiber impregnated with polymer, ceramic, or other matrix material), and the liner 130 may include a protective film 130a for the fiber-reinforced composite 120a. Various other types of substrates with various other types of liners are possible without departing from the scope of the present disclosure. Example other types of substrates include materials that need protective linings to protect against contamination or evaporation, such as adhesives, coatings, and the like.

Figure 2:
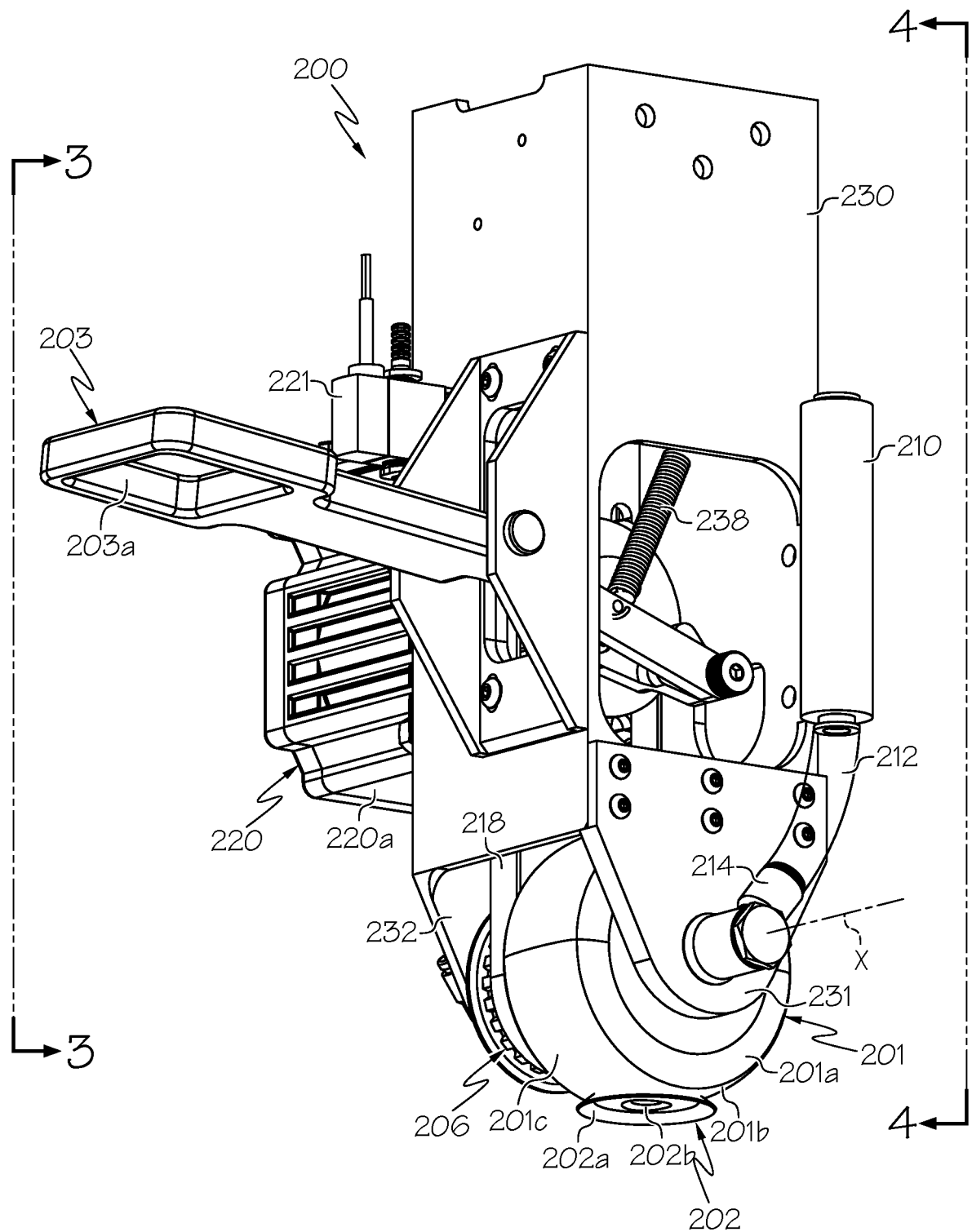
FIG. 2 is a perspective view of the apparatus of FIG. 1.
Figure 3:
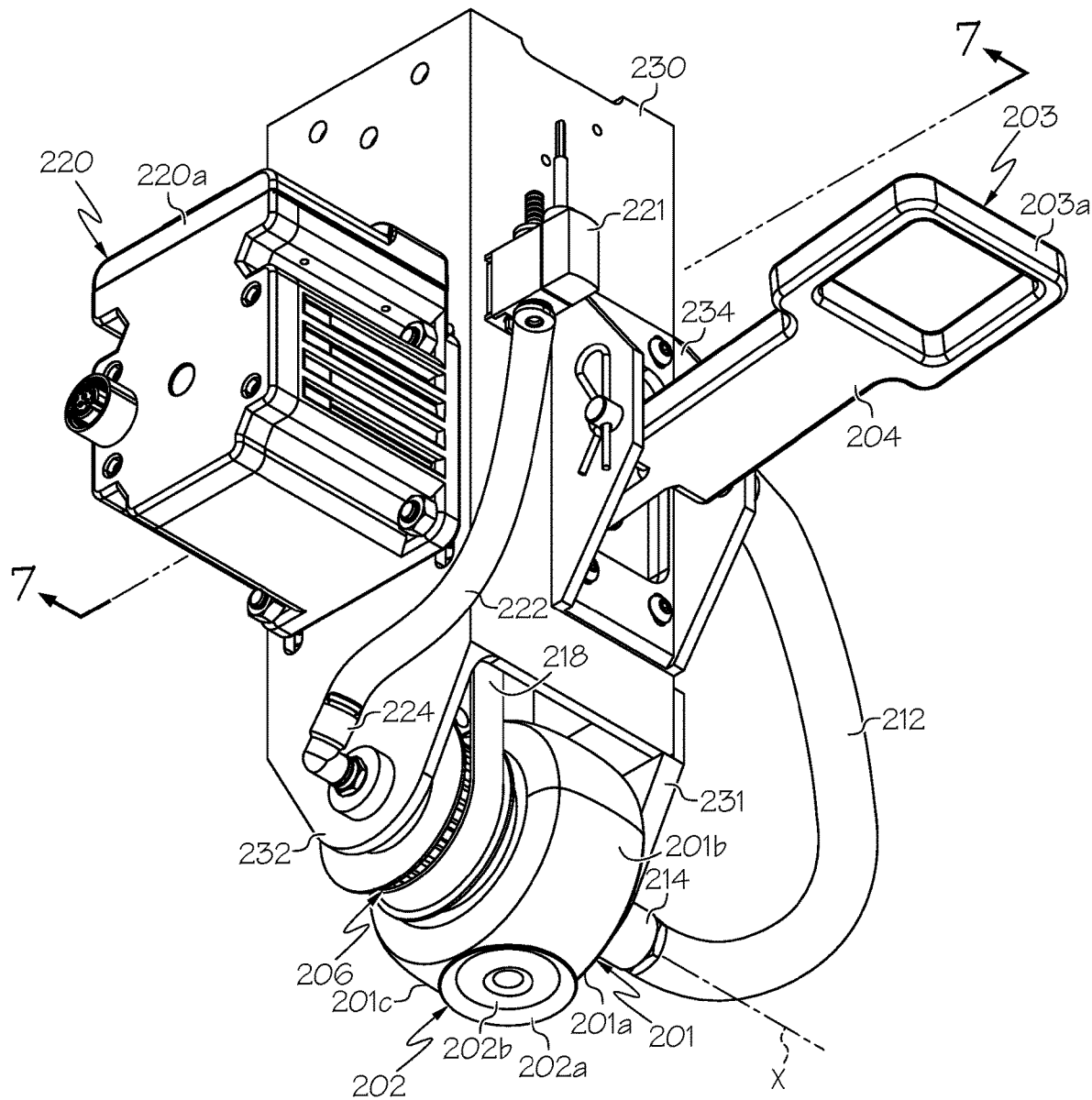
FIG. 3 is a perspective view looking approximately along line 3-3 in FIG. 2.
Figure 4:
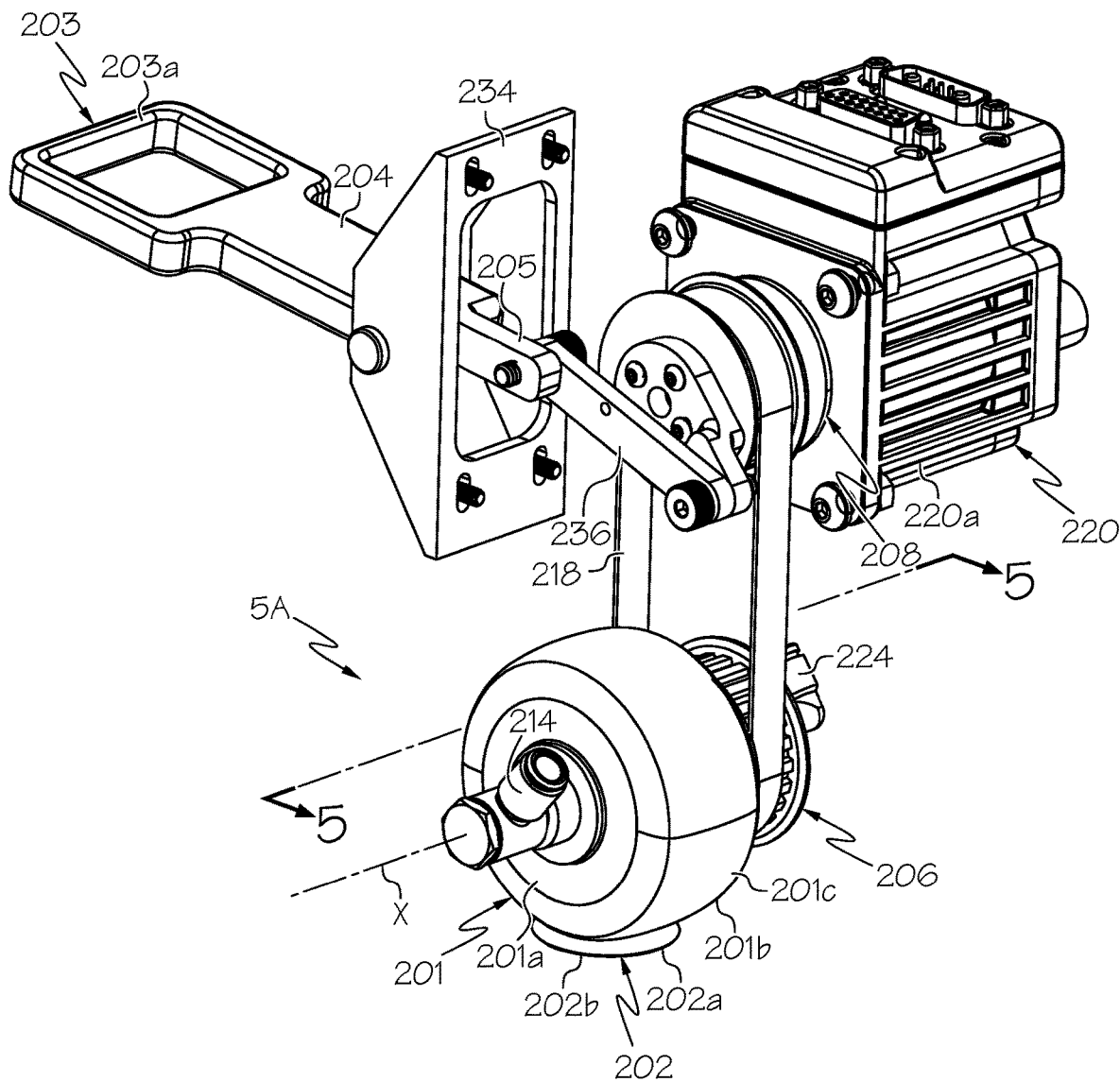
FIG. 4 is a perspective view, looking approximately along line 4-4 in FIG. 2, and showing certain parts removed.
Figure 5:
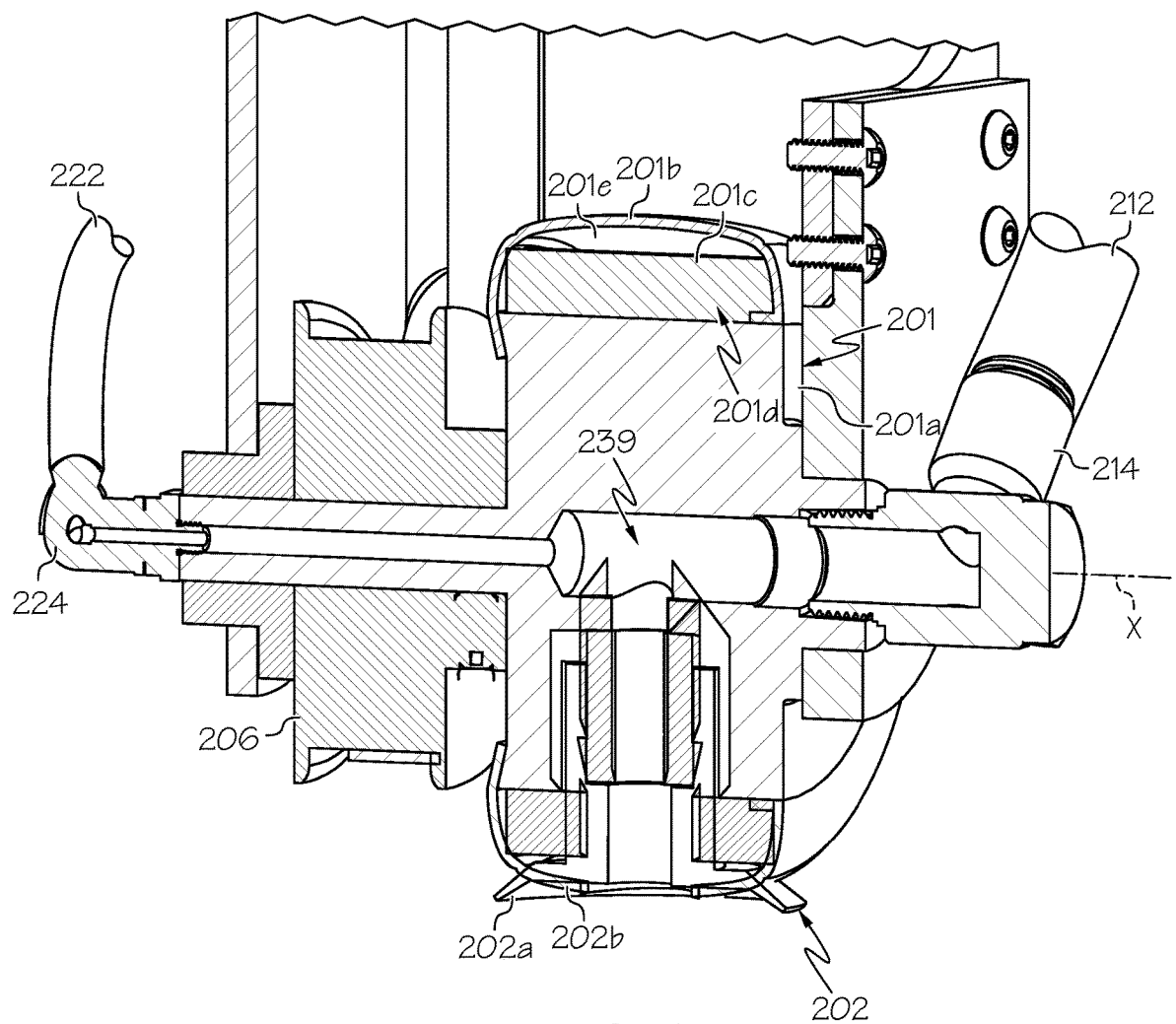
FIG. 5 is an enlarged sectional view, looking approximately along line 5-5 in FIG. 4, of a portion designated with reference numeral "5A" in FIG. 4.

Referring to FIG. 2, a perspective view of the apparatus 200 of FIG. 1 is illustrated. FIG. 3 is a perspective view looking approximately along line 3-3 in FIG. 2. FIG. 4 is a perspective view, looking approximately along line 4-4 in FIG. 2, and showing certain parts removed. FIG. 5 is an enlarged sectional view, looking approximately along line 5-5 in FIG. 4, of a portion designated with reference numeral "5A" in FIG. 4.

The apparatus 200 includes a main bracket 230 from which first and second lower brackets 231, 232 extend. The apparatus 200 includes a first member 201 rotatable about an axis "X", and a second member 202 disposed on the first member 201. The first member 201 is supported between the first and second lower brackets 231, 232 for rotation about its axis X. The apparatus 200 also includes a mounting bracket 234 attached to the main bracket 230.

The first member 201 is in the form of a wheel 201a or wheel segment having a longitudinal central axis (i.e., the axis X) and an outer circumferential surface 201b (or an arcuate surface if a wheel segment is used instead of a wheel). The first member 201 includes a soft elastomer material 201c that provides frictional contact between the elastomer material 201c and the liner 130 when the first member 201 rotates about its axis X.

The second member 202 is in the form of a suction cup 202b that is coupled to a vacuum-generating source 202a and is disposed on the outer circumferential surface 201b of the wheel 201a or wheel segment. The second member 202 is provided for generating a suction force to be applied to the liner 130 to peel the portion 131 of the liner 130 away from the substrate 120 when the suction force of the second member 202 is applied to the liner 130 and the first member 201 is rotating about its axis X. A coaxial vacuum generator 210 (FIG. 2) is connected through a first vacuum hose 212 to a first vacuum port 214. Other forms of vacuum generators or vacuum sources are possible.

The apparatus 200 also includes a third member 203 synchronized to rotation of the first member 201 about its axis X such that the third member 203 clamps the peeled portion 131 of the liner 130 against the first member 201 while the second member 202 is applying suction force to the liner 130 and the first member 201 is rotating about its axis X. The third member 203 is in the form of a pinch arm 203a synchronized to rotation of the wheel 201a or wheel segment about its longitudinal central axis X. The pinch arm 203a has a first end 204 and a second end 205 opposite the first end 204 (best shown in FIG. 4). The pinch arm 203a is pivotally mounted to the mounting bracket 234.

A drive sprocket 206 is operatively coupled to the wheel 201a or wheel segment and another drive sprocket 208 (FIG. 4) is operatively coupled to the pinch arm 203a. A linkage mechanism 236 (best shown in FIG. 4) interconnects the second end 205 of the pinch arm 203a and the drive sprocket 208. A toothed belt 218 is coupled between the drive sprocket 206 of the wheel 201a or wheel segment and the drive sprocket 208 of the pinch arm 203a to provide synchronized motion between the wheel 201a or wheel segment and the pinch arm 203a. An actuator 220 is drivingly coupled to the drive sprocket 208 of the pinch arm 203a. The actuator 220 may include a drive motor 220a, for example. Movement of the drive motor 220a is synchronized to movement of the suction cup 202b via the linkage mechanism 236. Other forms of mechanisms (e.g., an independent servo motor synchronized to movement of the suction cup 202b) are possible.

A pressure sensor 221 is provided for monitoring quality of a vacuum generated by the second member 202. The pressure sensor 221 is connected through a second vacuum hose 222 to a second vacuum port 224.

A spring 238 (FIG. 2) is attached to the linkage mechanism 236 so as to maintain the pinch arm 203a in unactivated position shown in FIG. 2. As shown in FIG. 5, a vacuum path 239 interconnects the first vacuum port 214 and the second vacuum port 224. Also, as shown in FIG. 5, the wheel 201a has tire foam 201d and an air gap 201e that is located between the tire foam 201d and the outer circumferential surface 201b to provide for an increasing compression force. The tire foam 201d can be selected based upon the material to be pulled away. For example, the tire foam 201d may be selected based upon any combination of factors including physical, mechanical, and chemical properties of the liner 130 and physical, mechanical, and chemical properties of the substrate 120.

Referring back to FIG. 1, the system 100 includes an example computer system 600 capable of controlling the transport machine 110 and the apparatus 200. Computer system 600 includes processing unit 602 that executes instructions stored in internal data storage unit 604, external data storage unit (not shown), or a combination thereof. Processing unit 602 may include any type of technology. For example, processing unit 602 may include a general-purpose electronic processor. Other types of processors and processing unit technologies are possible.

Internal data storage unit 604 may include any type of technology. For example, internal data storage unit 604 may include random access memory (RAM), read only memory (ROM), solid state memory, or any combination thereof. Other types of memories and data storage unit technologies are possible.

Computer system 600 further includes a number of input/output (I/O) devices 606 that may include any type of technology. For example, I/O devices 606 may include a keypad, a keyboard, a touch-sensitive display screen, a liquid crystal display (LCD) screen, a microphone, a speaker, or any combination thereof. Other types of I/O devices and technologies are possible.

The processing unit 602 controls the transport machine 110 and the apparatus 200 including the vacuum generator 210 and the drive motor 220a to peel the liner 130 away from the substrate 120, as will be described in detail hereinbelow with reference to FIGS. 7-11.

Figure 7:
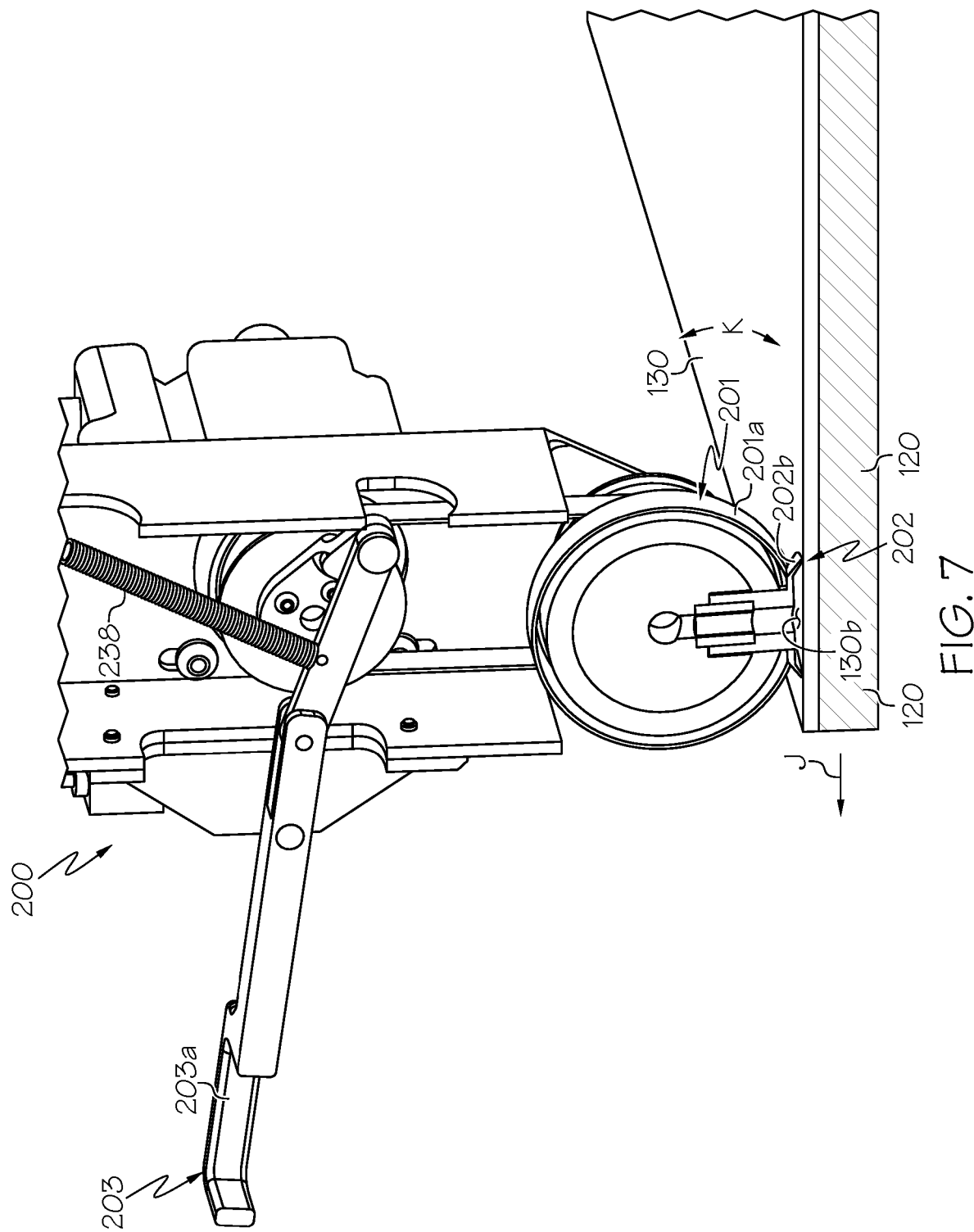
FIG. 7 is a sectional view, taken approximately along line 7-7 in FIG. 3, and showing the apparatus in a first stage of operation.
Figure 8:
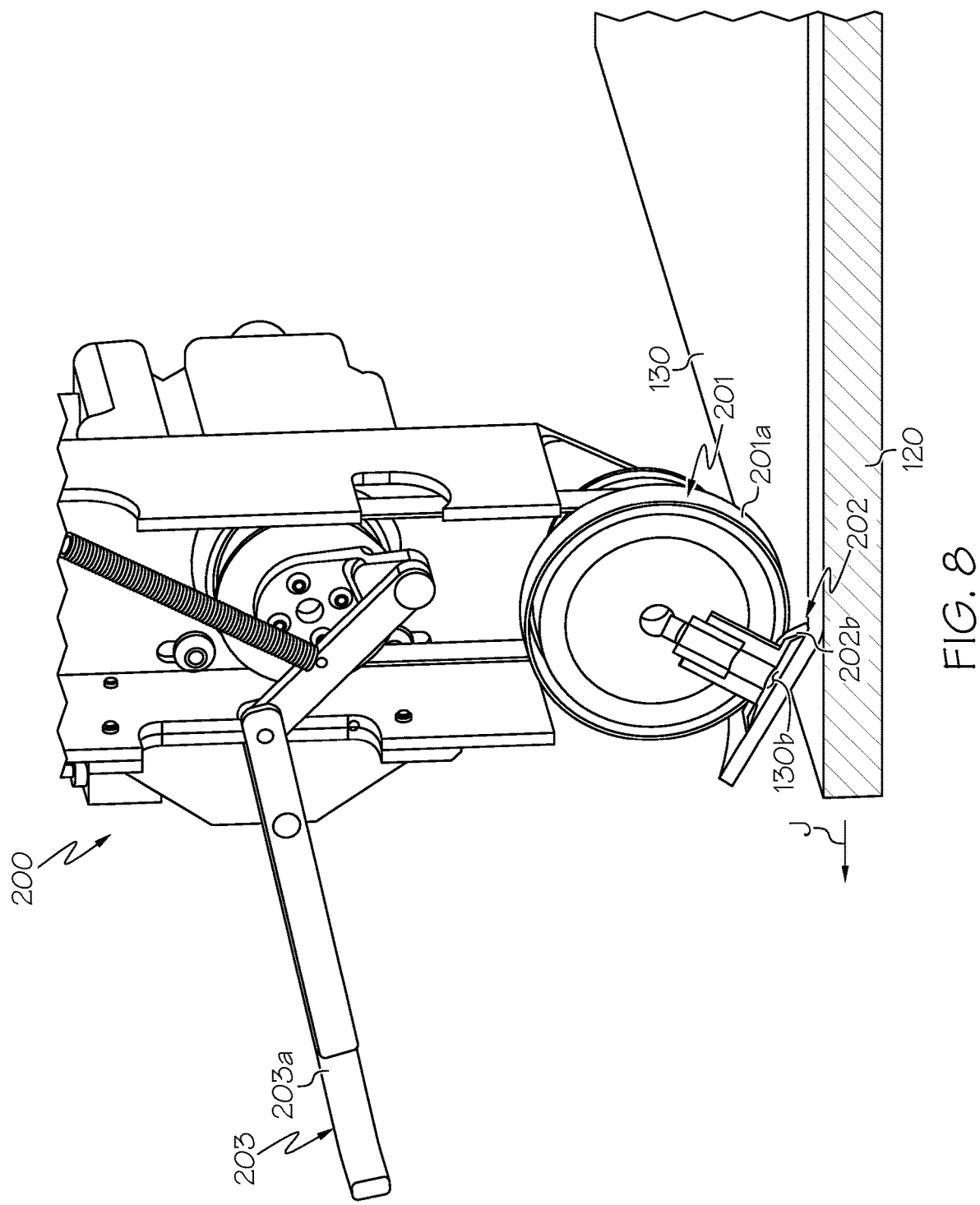
FIG. 8 is a sectional view similar to FIG. 7, and showing the apparatus in a second stage of operation.
Figure 9:
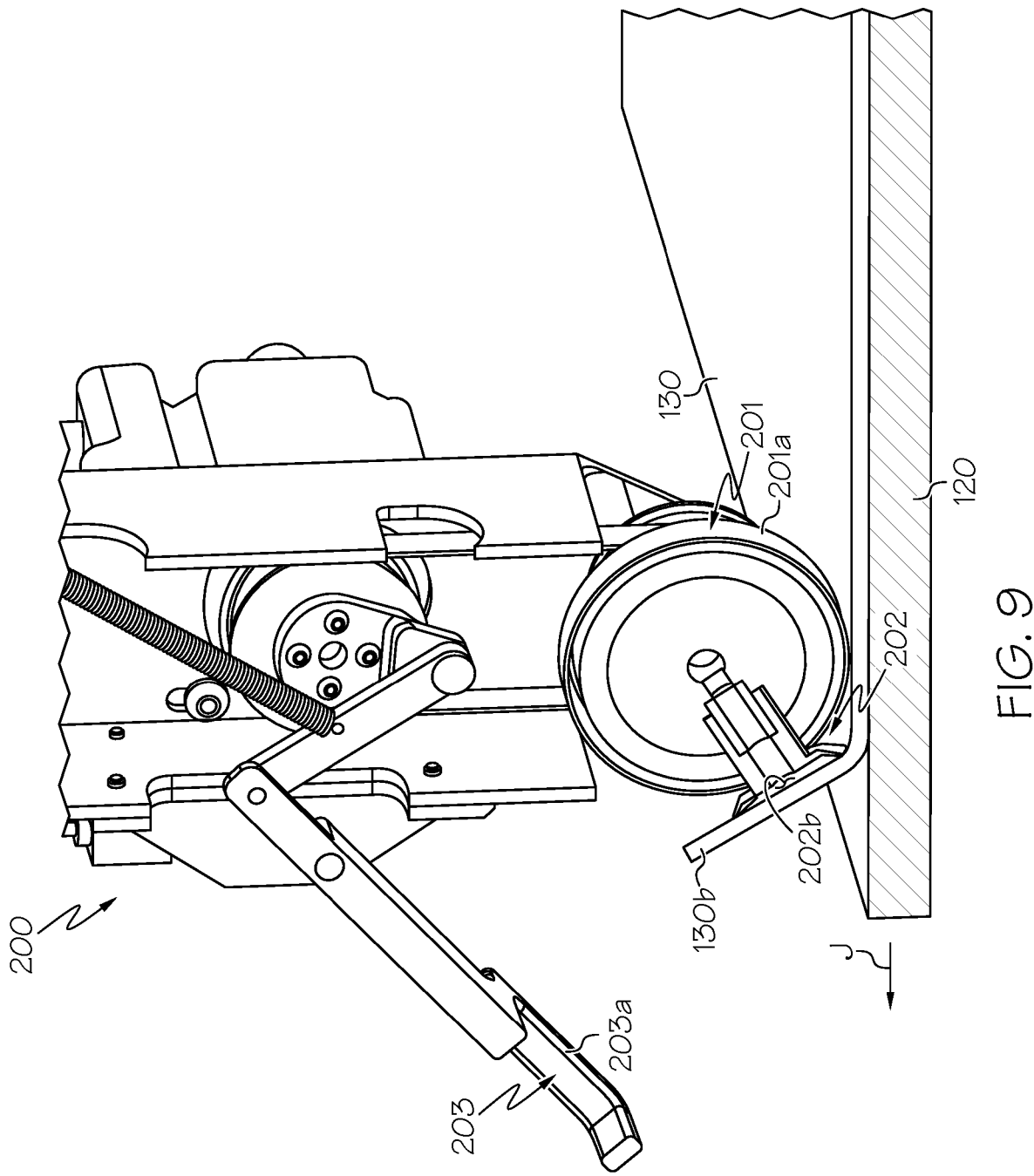
FIG. 9 is a sectional view similar to FIG. 8, and showing the apparatus in a third stage of operation.
Figure 10:
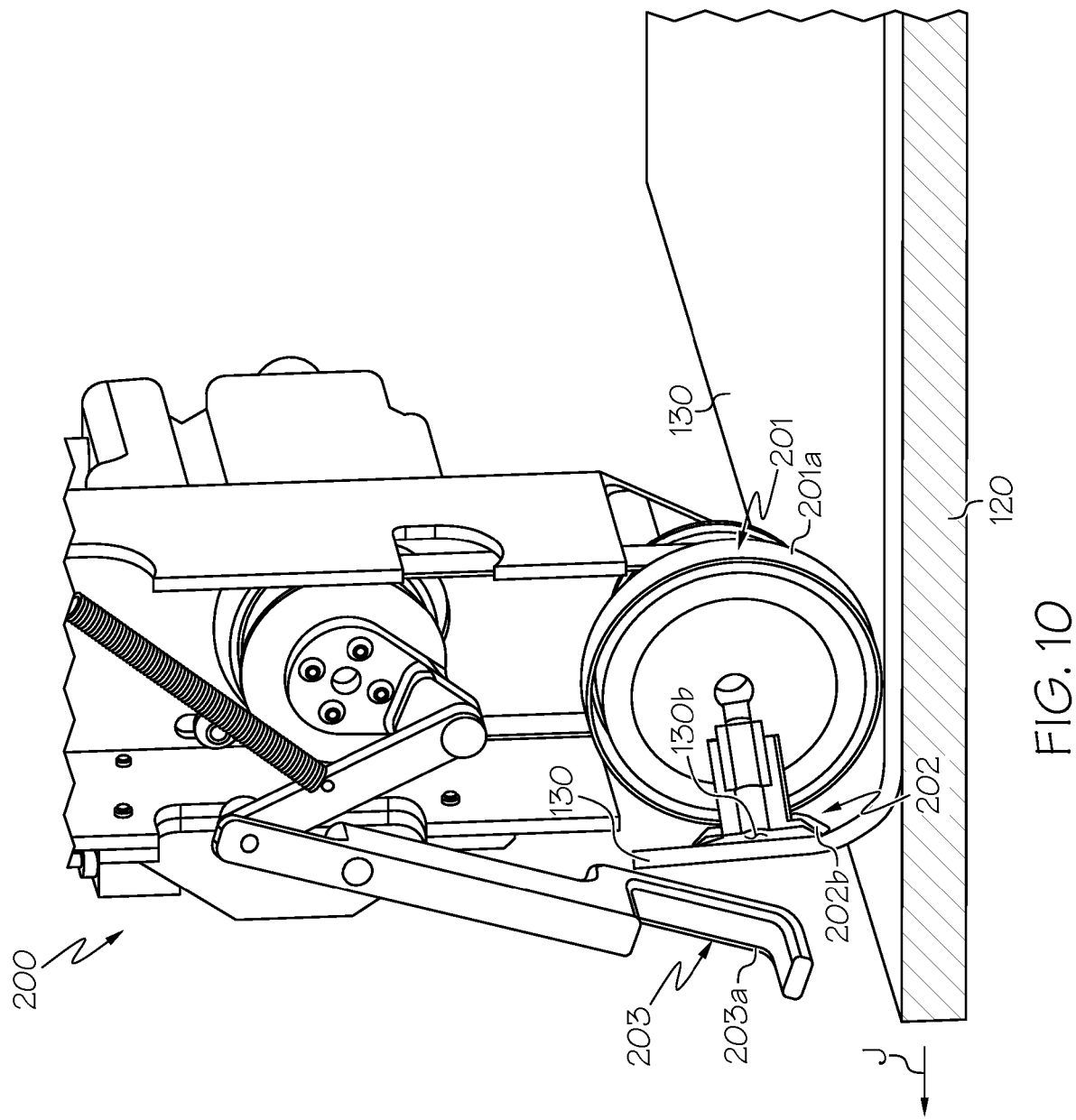
FIG. 10 is a sectional view similar to FIG. 9, and showing the apparatus in a fourth stage of operation.
Figure 11:
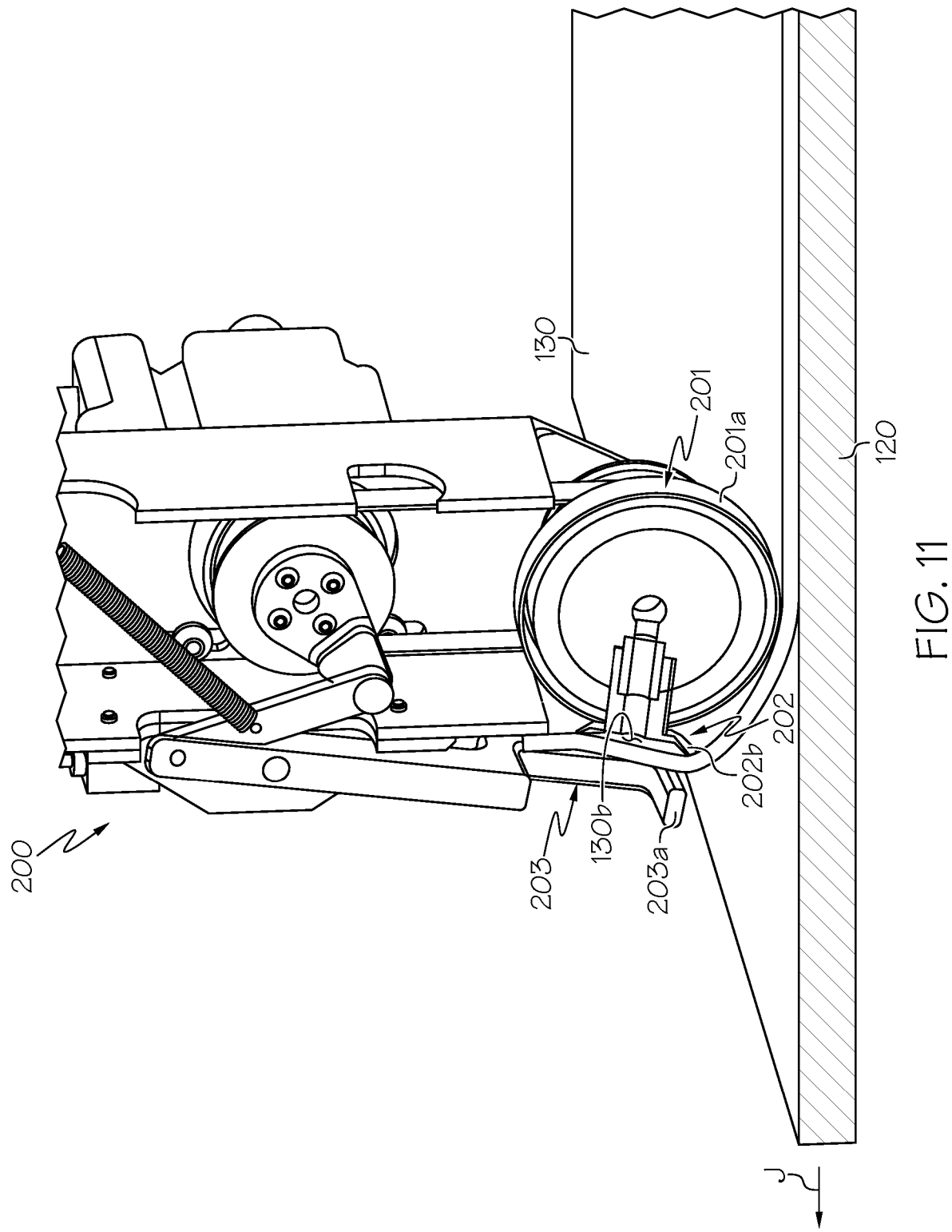
FIGS. 11 and 12 are sectional views similar to FIG. 10, and showing the apparatus in a fifth stage of operation.
Figure 12:
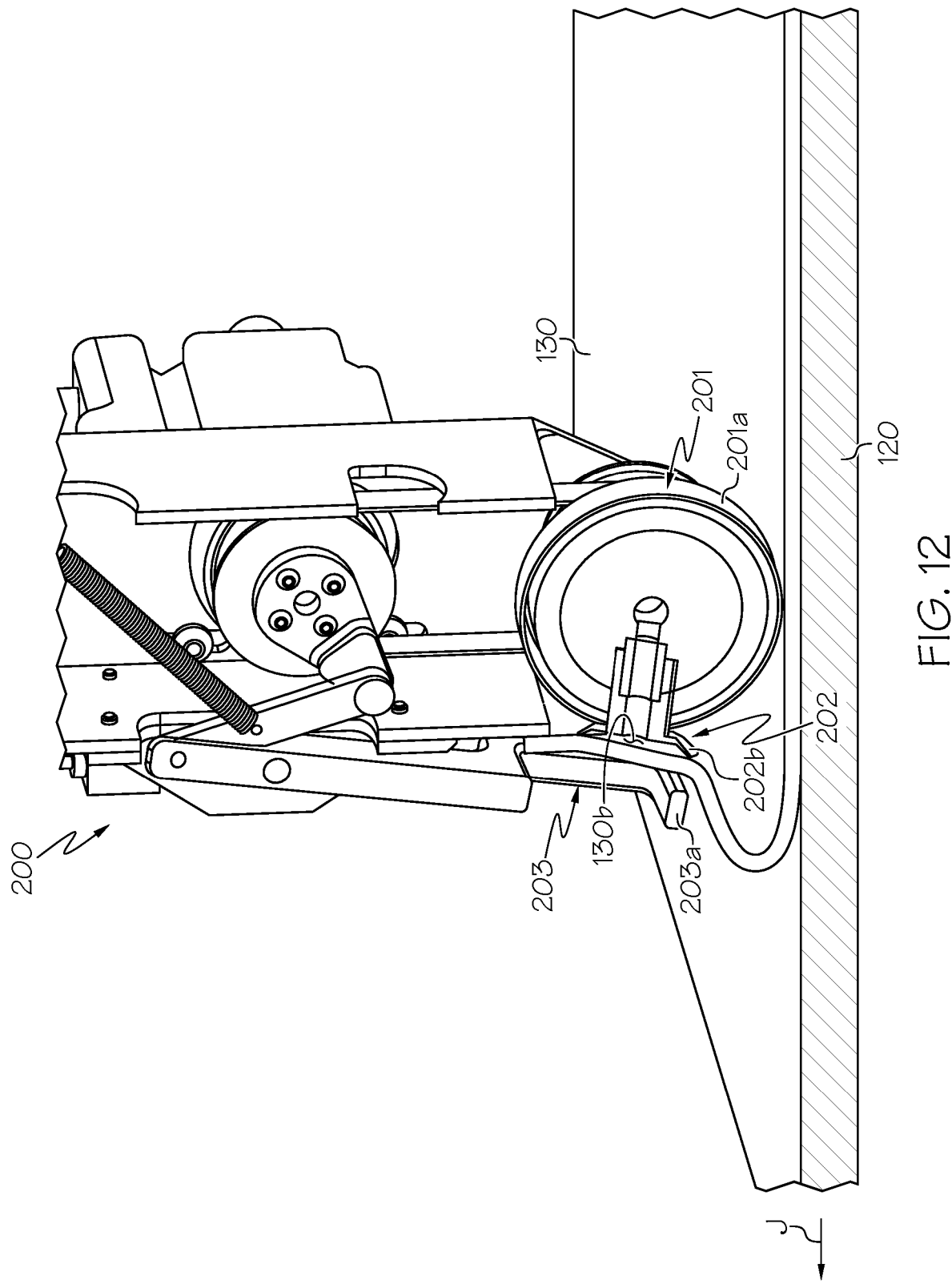

Each of FIGS. 7-12 shows the apparatus 200 in a different stage of operation. More specifically, FIG. 7 is a sectional view, taken approximately along line 7-7 in FIG. 3, and shows the apparatus 200 in a first stage of operation. FIG. 8 is a sectional view similar to FIG. 7, and shows the apparatus 200 in a second stage of operation. FIG. 9 is a sectional view similar to FIG. 8, and shows the apparatus in a third stage of operation. FIG. 10 is a sectional view similar to FIG. 9, and shows the apparatus in a fourth stage of operation. FIGS. 11 and 12 are sectional views similar to FIG. 10, and show the apparatus in a fifth stage of operation.

During the first stage of operation shown in FIG. 7, the suction cup 202b is presented onto a corner portion 130b of the liner 130 on the substrate 120 to releasably engage the corner portion 130b. Contact between the suction cup 202b and the corner portion 130b is roughly coplanar. The substrate 120 has sufficient stiffness which the suction cup 202b can press against. The substrate 120 and the liner 130 moves from right to left in the direction of arrow "J". Alternatively, or in addition to, it is conceivable the apparatus 200 move relative to the substrate 120 and the liner 130. Vacuum is applied to pull the corner portion 130b onto the suction cup 202b. A shearing motion may be effected between the liner 130 and the substrate 120 during relative motion between the liner 130 and the outer circumferential surface 201b of the wheel 201a. A twisting motion in the direction of arrow "K" may be applied to initially break the corner portion 130b of the liner 130 away from the substrate 120.

More specifically, once the suction cup 202b is attached to the liner 130, the wheel 201a is laterally moved opposite of the arrow J or the substrate 120 in the direction of arrow J about 10 mm, then returned to the original position in order to produce a shearing action between the liner 130 and the substrate 120, in an attempt to break the liner 130 free from the substrate 120. After returning to the original position, then the typical peel process can commence by rotating the wheel 201a and moving relative to the substrate 120.

During the second stage of operation shown in FIG. 8, the substrate 120 and the liner 130 continue to move to the left in the direction of arrow J. Alternatively, or in addition to, it is conceivable the apparatus 200 move relative to the substrate 120 and the liner 130. As the substrate 120 and the liner 130 continue to move to the left, the wheel 201a rotates about its axis X to match the corresponding movement of the substrate 120 and the liner 130 to keep the liner 130 in tension. The corner portion 130b of the liner 130 lifts with the vacuum-generating source 202a, following motion of the wheel 201a. The pinch arm 203a begins to pivot downward.

During the third stage of operation shown in FIG. 9, the substrate 120 and the liner 130 continue to move to the left in the direction of arrow J, and the wheel 201a remains pressing onto the substrate 120. Alternatively, or in addition to, it is conceivable the apparatus 200 move relative to the substrate 120 and the liner 130. As the substrate 120 and the liner 130 continue to move to the left, the liner 130 begins to wrap around the wheel 201a. The pinch arm 203a continues to pivot downward.

During the fourth stage of operation shown in FIG. 10, the substrate 120 and the liner 130 continue to move to the left in the direction of arrow J. Alternatively, or in addition to, it is conceivable the apparatus 200 move relative to the substrate 120 and the liner 130. As the substrate 120 and the liner 130 continue to move to the left, more of liner 130 wraps around the wheel 201a keeping the liner 130 in tension. The pinch arm 203a continues to pivot downward and begins to engage portion 130c of liner 130 that has been peeled away from the substrate 120. The portion 130c begins to roll up as it starts to detach from the applied vacuum as the suction cup 202b continues to rotate. The pinch arm 203a then moves in to grab the portion 130c.

During the fifth stage of operation shown in FIGS. 11 and 12, the substrate 120 and the liner 130 continue to move to the left in the direction of arrow J. Alternatively, or in addition to, it is conceivable the apparatus 200 move relative to the substrate 120 and the liner 130. As the substrate 120 and the liner 130 continue to move to the left, more of the liner 130 wraps around the wheel 201a. The pinch arm 203a continues to pivot downward and clamps rolled-up portion 130d of liner 130 that has been peeled away from the substrate 120 against the outer circumferential surface 201b of the wheel 201a to trap the liner 130. At this time, the wheel 201a should not be in contact with the substrate 120. Also, the liner 130 no longer needs to be in tension. Continued motion in the direction of arrow J results in the liner 130 doubling backwards against the pinch arm 203a and the suction cup 202b, as best shown in FIG. 12. The pinch arm 203a ensures that the liner 130 is secured. Without the pinch arm 203a, the liner 130 could easily move away from the suction cup 202b.

The suction cup 202b is also no longer contributing to peeling the liner 130 away from the substrate 120 at this time. However, depending upon timing of the linkage mechanism 236, the pinch arm 203a (not visible in FIGS. 11 and 12) could clamp the rolled-up portion 130d of the liner 130 against the suction cup 202b. In this case, the suction cup 202b would continue to contribute to peeling the liner 130 away from the substrate 120.

After the fifth stage shown in FIGS. 11 and 12 and once the entire liner 130 has been removed from the substrate 120, the apparatus 200 relocates to a location where the liner 130 can be disposed of. The liner 130 now trapped is then released and falls away (or is actively removed) from the apparatus 200. The vacuum at the suction cup 202b may need to be turned off to release the liner 130. The apparatus 200 then returns to the position of the first stage of operation shown in FIG. 7 to begin peeling away the next liner from the next substrate. The pinch arm 203a is returned by way of the biasing force of the spring 238 to its starting position shown in FIG. 7.

Figure 13C:
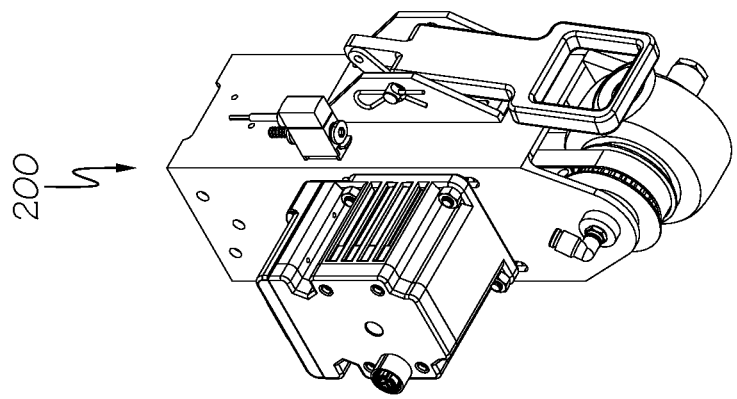
FIGS. 13A, 13B, and 13C are a sequence of views similar to FIG. 3, and showing the apparatus progressing through its range of motion at different stages of operation.
Figure 13B:
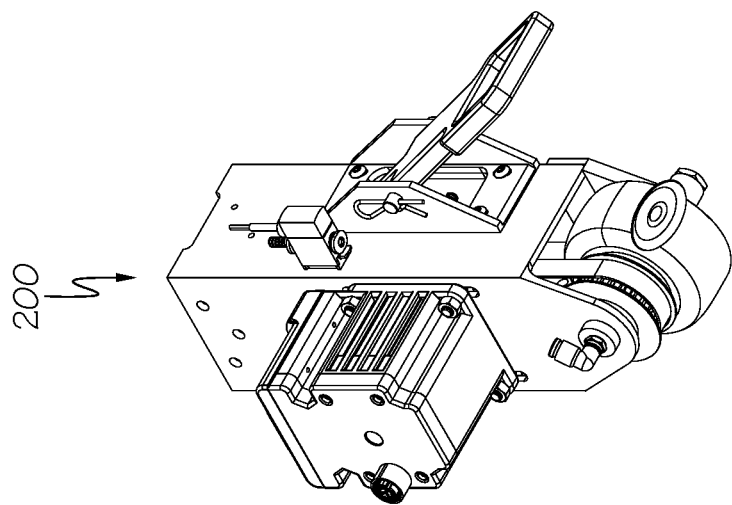
Figure 13A:
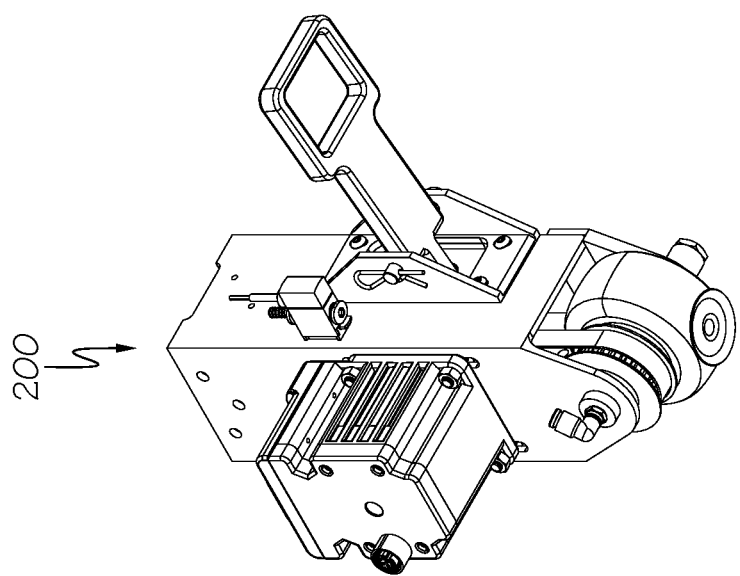

Referring to FIGS. 13A, 13B, and 13C, a sequence of views similar to FIG. 3 is illustrated. More specifically, FIGS. 13A, 13B, and 13C show the apparatus 200 progressing through its range of motion at different stages of operation. Initially, FIG. 13A shows the apparatus 200 in its starting positon (such as shown in the first stage of operation of FIG. 7). FIG. 13B then shows the apparatus 200 in an intermediate position (such as shown in either the third stage of operation of FIG. 9 or the fourth stage of operation of FIG. 10). Finally, FIG. 13C shows the apparatus 200 in its ending position (such as shown in the fifth stage of operation of FIGS. 11 and 12).

Figure 14:
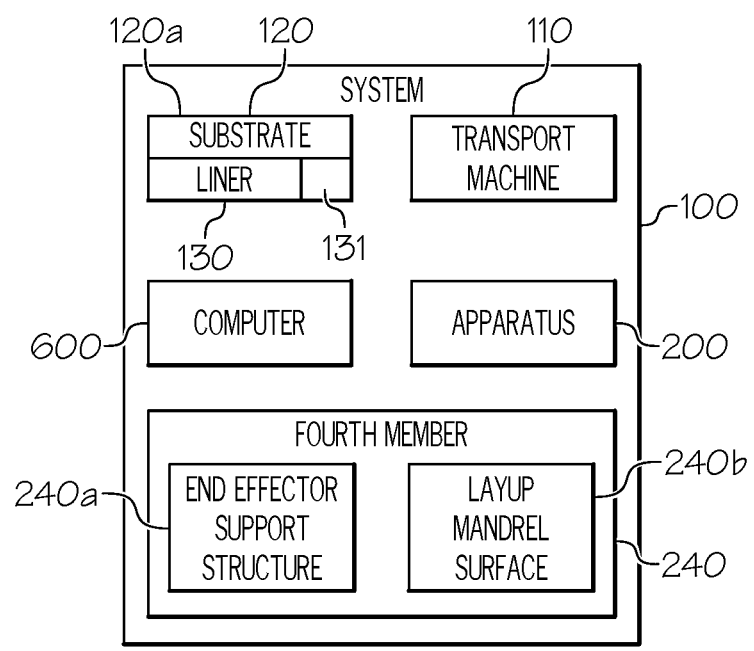
FIG. 14 is a block diagram similar to FIG. 1, and showing a system that includes an apparatus and an additional member in accordance with an example.

Referring to FIG. 14, a block diagram similar to FIG. 1 is illustrated. More specifically, FIG. 14 shows the system 100 of FIG. 1 including the apparatus 200 described hereinabove and a fourth member 240 in accordance with an example.

With reference to FIG. 14 and the description of apparatus 200 described hereinabove, the fourth member 240 provides a surface against which a combination of the first member 201, the second member 202, and the third member 203 can act while the liner 130 is being peeled away from the substrate 120. The fourth member 240 may be in the form of an end effector support structure 240a that provides sufficient local rigid backing against which the combination of the first member 201, the second member 202, and the third member 203 can act while the liner 130 is being peeled away from the substrate 120. Alternatively, or in addition to, the fourth member 240 may be in the form of a layup mandrel surface 240b that provides sufficient local rigid backing against which the combination of the first member 201, the second member 202, and the third member 203 can act while the liner 130 is being peeled away from the substrate 120.

Figure 6:
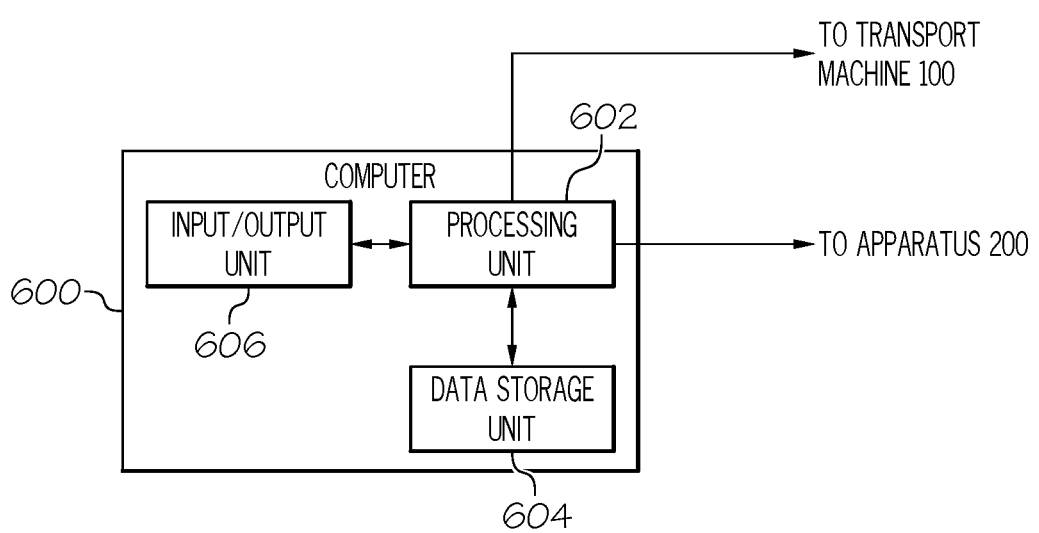
FIG. 6 shows an example computer system associated with the system of FIG. 1 and capable of peeling a liner away from a substrate.
Figure 15:
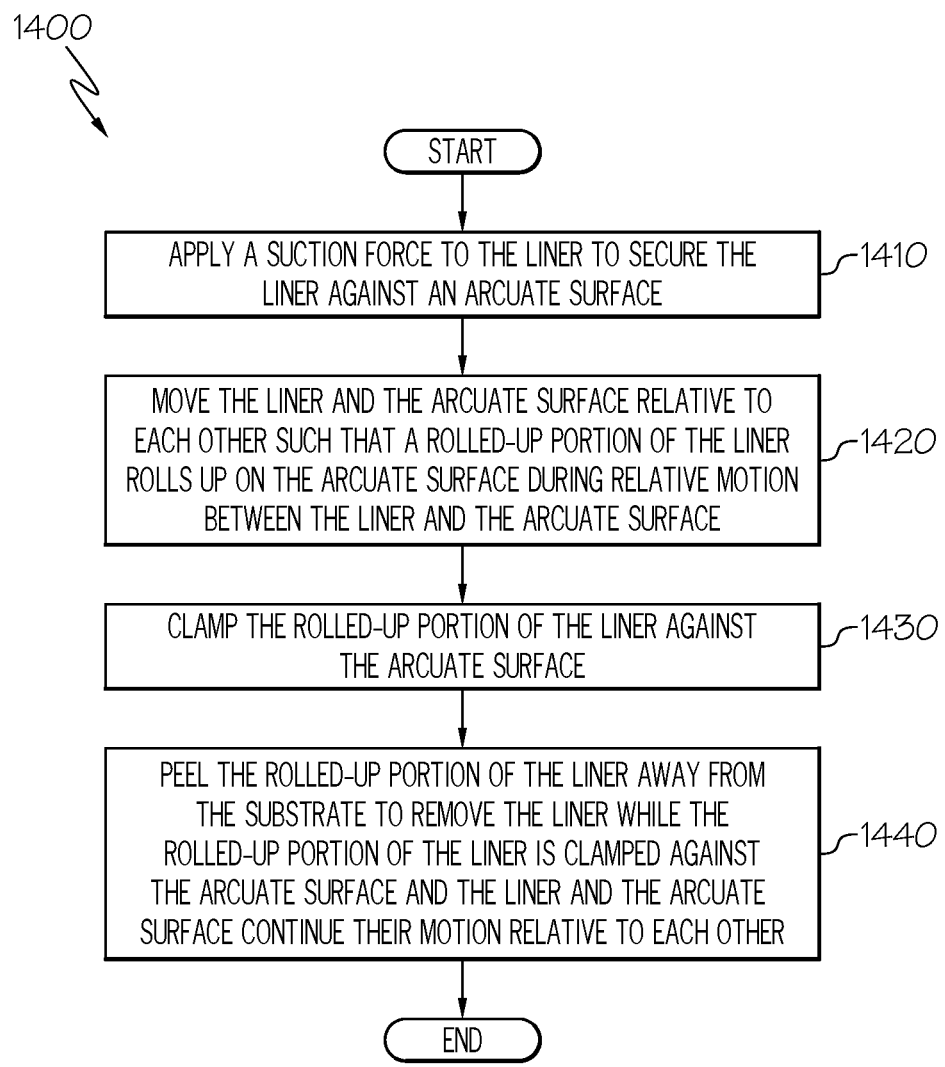
FIG. 15 is a flow diagram depicting an example method for peeling a liner away from a substrate in accordance with an example.

Referring to FIG. 15, flow diagram 1400 depicts a method for operating the example computer system 600 of FIG. 6 to control operation of the apparatus 200 of FIG. 1 to peel a liner away from a substrate in accordance with an example. In block 1410, a suction force is applied to the liner to secure the liner against an arcuate surface. Then in block 1420, the liner and the arcuate surface are moved relative to each other such that a rolled-up portion of the liner rolls up on the arcuate surface during relative motion between the liner and the arcuate surface. The process proceeds to block 1430 in which the rolled-up portion of the liner is clamped against the arcuate surface. Then in block 1440, the rolled-up portion of the liner is peeled away from the substrate to remove the liner while the rolled-up portion of the liner is clamped against the arcuate surface and the liner and the arcuate surface continue their motion relative to each other. The process then ends.

In some examples, the suction force is applied through an outer circumferential surface of a wheel or wheel segment such that a shearing motion is effected between the liner and the substrate during relative motion between the liner and the outer circumferential surface of the wheel or wheel segment.

In some examples, the rolled-up portion of the liner is clamped against the outer circumferential surface of the wheel or wheel segment during relative motion between the liner and the outer circumferential surface of the wheel or wheel segment.

In some examples, the rolled-up portion of the liner is peeled away from the substrate to remove the liner while the rolled-up portion of the liner is clamped against the outer circumferential surface of the wheel or wheel segment and the liner and the outer circumferential surface continue their motion relative to each other.

In some examples, after applying the suction force to the liner, the liner and the substrate are twisted relative to each other to initially break the liner away from the substrate.

In some examples, the method further includes sensing pressure associated with the suction force to monitor quality of the suction force being applied to the liner.

In some examples, the substrate includes a fiber-reinforced composite, and the liner includes a protective film.

In some examples, the method is performed by a computer having a memory executing one or more programs of instructions which are tangibly embodied in a program storage medium readable by the computer.

In some examples, the method further includes rigidly backing the liner and the substrate to support the liner and the substrate against the arcuate surface while the liner is being peeled away from the substrate.

It should be apparent that the above-described bed apparatus 200 removes the need for operating personnel to access a layup mandrel surface 240b on which the substrate 120 and the liner 130 lies to manually peel the liner 130 away from the substrate 120. This not only reduces labor costs, but also reduces the time needed to manufacture a desired part. Thus, total production costs are reduced. Moreover, in some applications or environments, exposure of the operating personnel to certain materials or chemicals are reduced.

It should also be apparent that an automated or semi-automated process is provided to peel a liner away from a substrate. The automated or semi-automated process reduces labor costs associated with having to manually peel the liner away from the substrate.

Although the above description describes the transport machine 110 for moving the substrate 120 and the liner 130 to the apparatus 200, it is conceivable that the apparatus 200 be moved to the location of the substrate 120 and the liner 130 to remove the liner 130. The relative motion between the liner 130 and the outer circumferential surface 201b of the wheel 201a may be provided either way.

Also, although the above-description describes the first member 201 being in the form of the wheel 201a, it is conceivable that only a portion (i.e., a wheel segment) of the wheel 201a be used instead of the entire wheel 201a. Moreover, it is conceivable to just rotate the suction cup 202b without the wheel 201a. In this case, the pinch arm 203a would impinge on the suction cup 202b after the suction cup 202b rotates.

Figure 16:
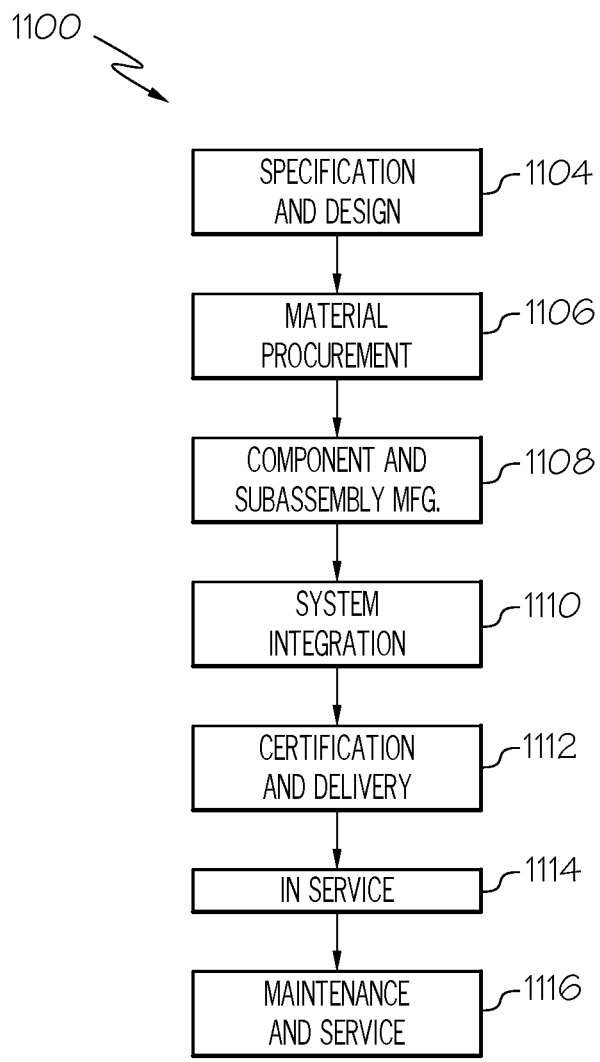
FIG. 16 is a flow diagram of an aircraft manufacturing and service methodology.
Figure 17:
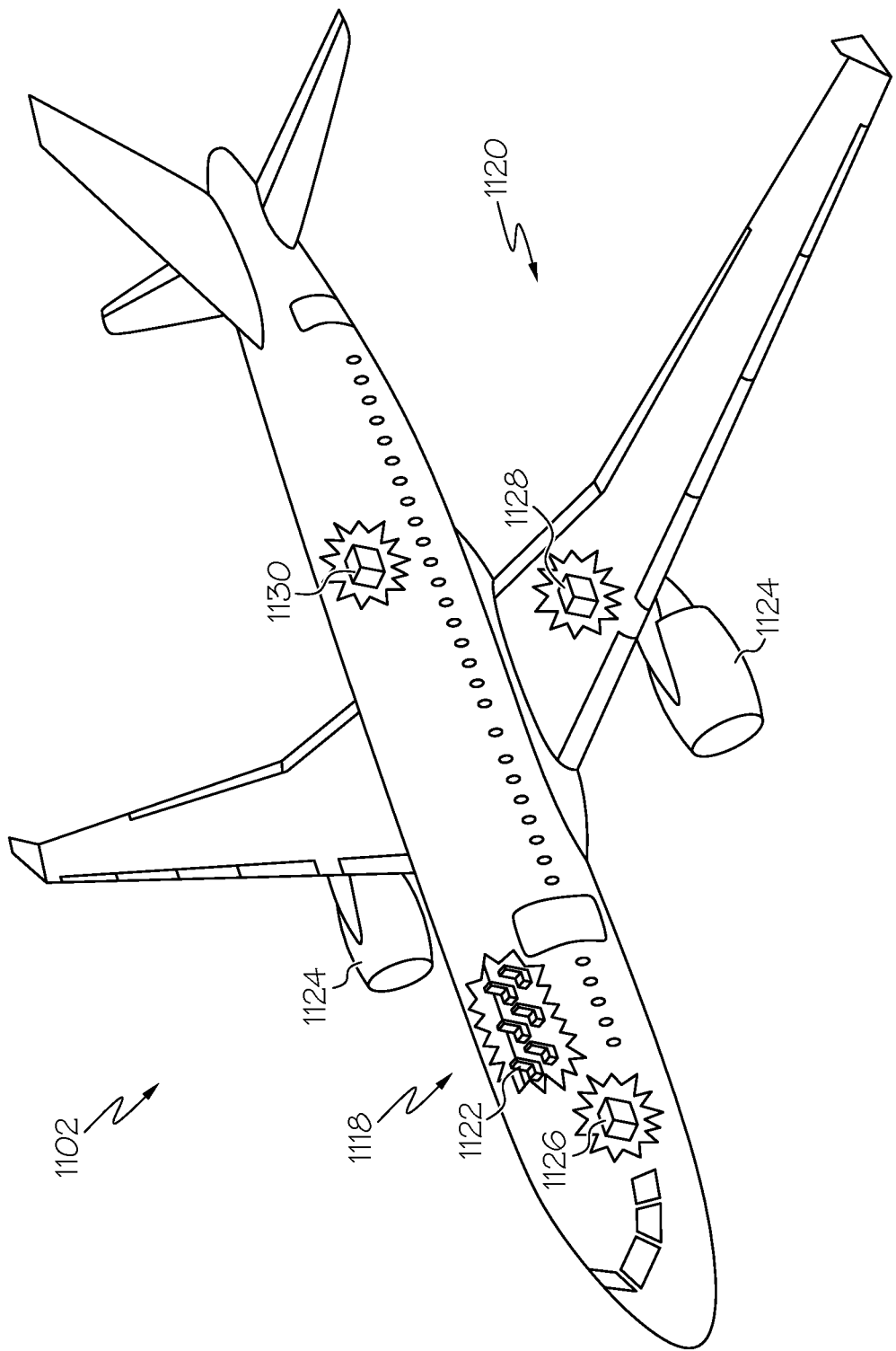
FIG. 17 is a block diagram of an aircraft.

Examples of the disclosure may be described in the context of an aircraft manufacturing and service method 1100, as shown in FIG. 16, and an aircraft 1102, as shown in FIG. 17. During pre-production, the aircraft manufacturing and service method 1100 may include specification and design 1104 of the aircraft 1102 and material procurement 1106. During production, component/subassembly manufacturing 1108 and system integration 1110 of the aircraft 1102 takes place. Thereafter, the aircraft 1102 may go through certification and delivery 1112 in order to be placed in service 1114. While in service by a customer, the aircraft 1102 is scheduled for routine maintenance and service 1116, which may also include modification, reconfiguration, refurbishment and the like.

Each of the processes of method 1100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 17, the aircraft 1102 produced by example method 1100 may include an airframe 1118 with a plurality of systems 1120 and an interior 1122. Examples of the plurality of systems 1120 may include one or more of a propulsion system 1124, an electrical system 1126, a hydraulic system 1128, and an environmental system 1130. Any number of other systems may be included.

The disclosed apparatus and method may be employed during any one or more of the stages of the aircraft manufacturing and service method 1100. As one example, components or subassemblies corresponding to component/subassembly manufacturing 1108, system integration 1110 and/or maintenance and service 1116 may be assembled using the disclosed apparatus method. As another example, the airframe 1118 may be constructed using the disclosed apparatus and method. Also, one or more apparatus examples, method examples, or a combination thereof may be utilized during component/subassembly manufacturing 1108 and/or system integration 1110, for example, by substantially expediting assembly of or reducing the cost of an aircraft 1102, such as the airframe 1118 and/or the interior 1122. Similarly, one or more of system examples, method examples, or a combination thereof may be utilized while the aircraft 1102 is in service, for example and without limitation, to maintenance and service 1116.

Aspects of disclosed examples may be implemented in software, hardware, firmware, or a combination thereof. The various elements of the system, either individually or in combination, may be implemented as a computer program product tangibly embodied in a machine-readable storage device for execution by a processor. Various steps of examples may be performed by a computer processor executing a program tangibly embodied on a computer-readable medium to perform functions by operating on input and generating output. The computer-readable medium may be, for example, a memory, a transportable medium such as a compact disk or a flash drive, such that a computer program embodying aspects of the disclosed examples can be loaded onto a computer.

The above-described apparatus and method are described in the context of an aircraft. However, one of ordinary skill in the art will readily recognize that the disclosed apparatus and method are suitable for a variety of applications, and the present disclosure is not limited to aircraft manufacturing applications. For example, the disclosed apparatus and method may be implemented in various types of vehicles including, for example, helicopters, passenger ships, automobiles, marine products (boat, motors, etc.) and the like. Non-vehicle applications are also contemplated.

Also, although the above-description describes an apparatus and method for peeling away a liner away from a substrate for enabling manufacture of an airplane part in the aviation industry in accordance with military and space regulations, it is contemplated that the apparatus and method may be implemented to facilitate manufacturing of a part in any industry in accordance with the applicable industry standards. The specific apparatus and method can be selected and tailored depending upon the particular application.

Further, although various examples have been shown and described, modifications may occur to those skilled in the art upon reading the specification. The present application includes such modifications and is limited only by the scope of the claims.

What is claimed is:

1. An apparatus for peeling a liner away from a substrate, the apparatus comprising:
    a first member rotatable about an axis;
    a second member disposed on the first member and for generating a suction force to be applied to the liner to peel a portion of the liner away from the substrate when the suction force of the second member is applied to the liner and the first member is rotating about its axis; and
    a third member synchronized to rotation of the first member about its axis such that the third member pivotably moves into engagement with and clamps the peeled portion of the liner against the first member while the second member is applying suction force to the liner and the first member is rotating about its axis.

2. The apparatus of claim 1 wherein the first member is in the form of a wheel or wheel segment having a longitudinal central axis and an outer circumferential surface.

3. The apparatus of claim 2 wherein the second member is in the form of a vacuum-generating source disposed on the outer circumferential surface of the wheel or wheel segment.

4. The apparatus of claim 3 wherein the third member is in the form of a pinch arm synchronized to rotation of the wheel or wheel segment about its longitudinal central axis.

5. The apparatus of claim 4 further comprising:
    a drive sprocket operatively coupled to the wheel or wheel segment and another drive sprocket operatively coupled to the pinch arm.

6. The apparatus of claim 5 further comprising:
    a toothed belt coupled between the drive sprocket of the wheel or wheel segment and the drive sprocket of the pinch arm to provide synchronized motion between the wheel or wheel segment and the pinch arm.

7. The apparatus of claim 6 further comprising:
    an actuator drivingly coupled to the drive sprocket of the pinch arm.

8. The apparatus of claim 3 further comprising:
    a sensor for monitoring quality of a vacuum generated by the second member.

9. The apparatus of claim 1 wherein the first member includes an elastomer material that provides frictional contact between the elastomer material and the liner when the first member rotates about its axis.

10. A system comprising:
    the apparatus of claim 1; and
    a fourth member having a surface against which a combination of the first member, the second member, and the third member can act while the liner is being peeled away from the substrate.

11. The system of claim 10 wherein the fourth member in the form of an end effector support structure that provides rigid backing against which the combination of the first member, the second, and the third member can act while the liner is being peeled away from the substrate.

12. The system of claim 10 wherein the fourth member in the form of a layup mandrel surface that provides rigid backing against which the combination of the first member, the second, and the third member can act while the liner is being peeled away from the substrate.

13. A method for automatically peeling a liner away from a substrate, the method comprising:
    applying a suction force to the liner to secure the liner against an arcuate surface;
    moving the liner and the arcuate surface relative to each other such that a rolled-up portion of the liner rolls up on the arcuate surface during relative motion between the liner and the arcuate surface;
    clamping the rolled-up portion of the liner with a pinch arm against the arcuate surface; and
    peeling the rolled-up portion of the liner away from the substrate to remove the liner while the rolled-up portion of the liner is clamped against the arcuate surface and the liner and the arcuate surface continue their motion relative to each other.

14. The method of claim 13 wherein applying a suction force to the liner to secure the liner against an arcuate surface includes:
    applying the suction force through an outer circumferential surface of a wheel or wheel segment such that a shearing motion is effected between the liner and the substrate during relative motion between the liner and the outer circumferential surface of the wheel or wheel segment.

15. The method of claim 14 wherein clamping the rolled-up portion of the liner against the arcuate surface includes:
    clamping the rolled-up portion of the liner against the outer circumferential surface of the wheel or wheel segment during relative motion between the liner and the outer circumferential surface of the wheel or wheel segment.

16. The method of claim 14 wherein peeling a portion including the rolled-up portion of the liner away from the substrate includes:
    peeling the rolled-up portion of the liner away from the substrate to remove the liner while the rolled-up portion of the liner is clamped against the outer circumferential surface of the wheel or wheel segment and the liner and the outer circumferential surface continue their motion relative to each other.

17. The method of claim 14 further comprising:
rigidly backing the liner and the substrate to support the liner and the substrate against the arcuate surface while the liner is being peeled away from the substrate.

18. The method of claim 13 wherein after applying the suction force to the liner, twisting the liner and the substrate relative to each other to initially break the liner away from the substrate.

19. The method of claim 13 further comprising:
sensing pressure associated with the suction force to monitor quality of the suction force being applied to the liner.

20. The method of claim 13 wherein the substrate comprises a fiber-reinforced composite, and the liner comprises a protective film.

* * * * *